United States Patent
Jung et al.

(10) Patent No.: US 11,580,964 B2
(45) Date of Patent: Feb. 14, 2023

(54) ELECTRONIC APPARATUS AND CONTROL METHOD THEREOF

(71) Applicant: Samsung Electronics Co., Ltd., Suwon-si (KR)

(72) Inventors: Pureum Jung, Suwon-si (KR); Hyeonmok Ko, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 280 days.

(21) Appl. No.: 17/003,176

(22) Filed: Aug. 26, 2020

(65) Prior Publication Data
US 2021/0166680 A1   Jun. 3, 2021

(30) Foreign Application Priority Data
Nov. 28, 2019   (KR) .................. 10-2019-0156146

(51) Int. Cl.
| G10L 15/183 | (2013.01) |
| G10L 15/22  | (2006.01) |
| G10L 15/18  | (2013.01) |
| G10L 15/08  | (2006.01) |

(52) U.S. Cl.
CPC ........ G10L 15/183 (2013.01); G10L 15/1815 (2013.01); G10L 15/22 (2013.01); *G10L 2015/088* (2013.01); *G10L 2015/223* (2013.01)

(58) Field of Classification Search
CPC ... G10L 15/183; G10L 15/1815; G10L 15/22; G10L 2015/088; G10L 2015/223; G10L 15/193; G10L 2015/228; G10L 15/32; G10L 17/24; G10L 15/26; G10L 17/04; G10L 2015/225; G06F 3/167
See application file for complete search history.

(56) References Cited

U.S. PATENT DOCUMENTS

| 10,175,933 B1* | 1/2019 | Wagner ............... H04H 20/18 |
| 10,311,875 B2 | 6/2019 | Halstvedt et al. |
| 11,158,308 B1* | 10/2021 | Bissell ................. G10L 15/22 |
| 2014/0136213 A1 | 5/2014 | Kim et al. |
| 2016/0217795 A1* | 7/2016 | Lee .................... G10L 17/24 |
| 2016/0267913 A1 | 9/2016 | Kim et al. |

(Continued)

FOREIGN PATENT DOCUMENTS

KR   10-2019-0001067 A   1/2019

*Primary Examiner* — Daniel C Washburn
*Assistant Examiner* — Athar N Pasha
(74) *Attorney, Agent, or Firm* — Jefferson IP Law, LLP

(57) ABSTRACT

An electronic apparatus is provided. The electronic apparatus includes a microphone, a memory configured to store a plurality of keyword recognition models, and a processor, which is coupled with the microphone and the memory, configured to control the electronic apparatus, wherein the processor is configured to selectively execute at least one keyword recognition model among the plurality of keyword recognition models based on operating state information of the electronic apparatus, based on a first user voice being input through the microphone, identify whether at least one keyword corresponding to the executed keyword recognition model is included in the first user voice by using the executed keyword recognition model, and based on at least one keyword identified as being included in the first user voice, perform an operation of the electronic apparatus corresponding to the at least one keyword.

18 Claims, 10 Drawing Sheets

(56) References Cited

U.S. PATENT DOCUMENTS

| | | |
|---|---|---|
| 2018/0182382 A1 | 6/2018 | Lee |
| 2018/0233136 A1* | 8/2018 | Torok ..................... G10L 15/22 |
| 2018/0336275 A1 | 11/2018 | Graham et al. |
| 2019/0027131 A1* | 1/2019 | Zajac, III ................ G10L 15/02 |
| 2019/0027139 A1 | 1/2019 | Hsu et al. |
| 2020/0111497 A1* | 4/2020 | Littlejohn ............. H04M 1/724 |
| 2020/0184959 A1* | 6/2020 | Yasa ................... G10L 15/1815 |
| 2020/0184966 A1* | 6/2020 | Yavagal .................. G10L 15/30 |
| 2020/0272690 A1* | 8/2020 | Howard ................ G06F 40/284 |
| 2020/0365148 A1* | 11/2020 | Ji ............................ G10L 15/22 |

* cited by examiner

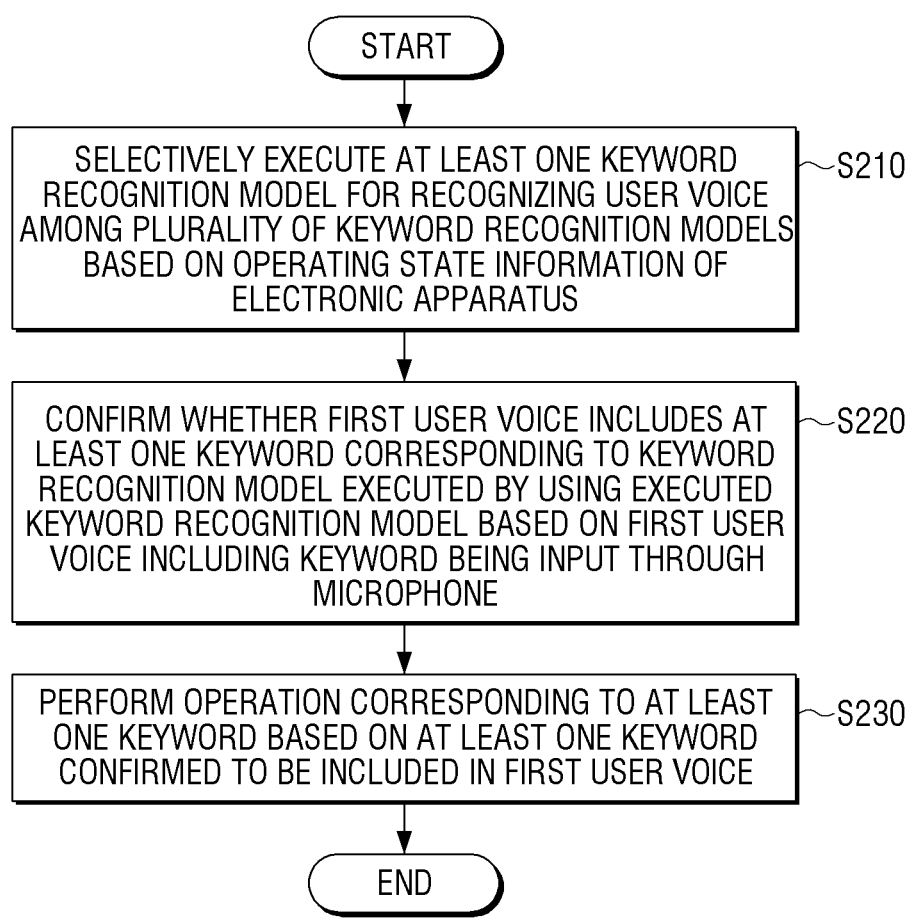

FIG. 3B
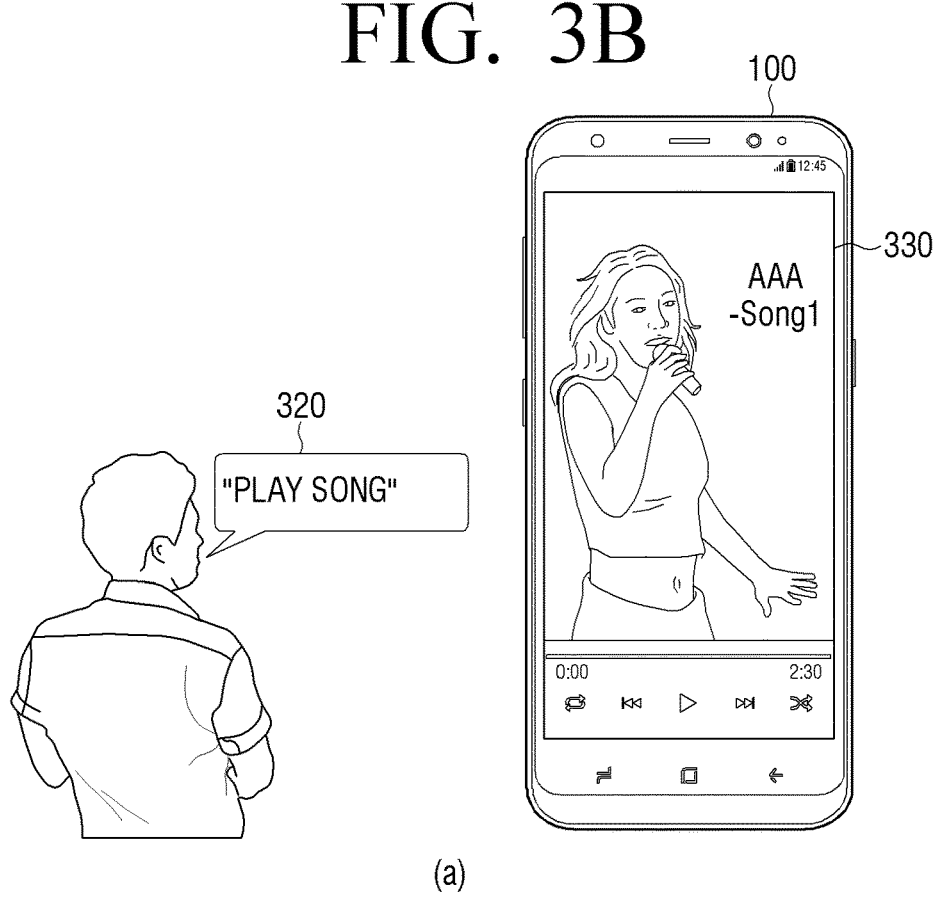
(a)
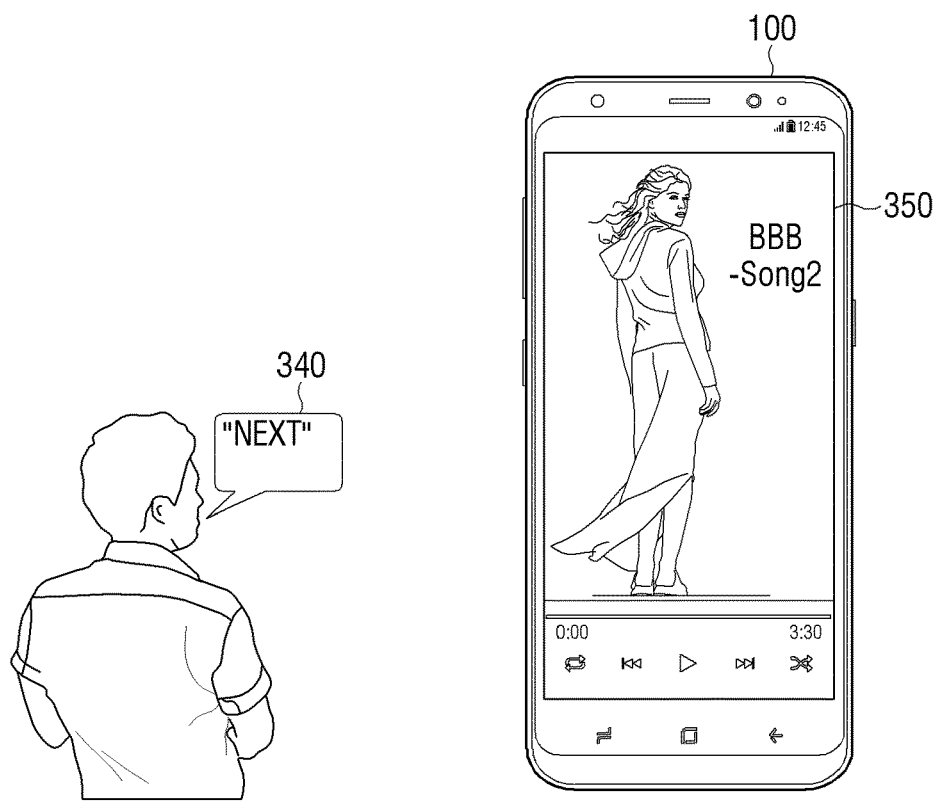
(b)

FIG. 4C
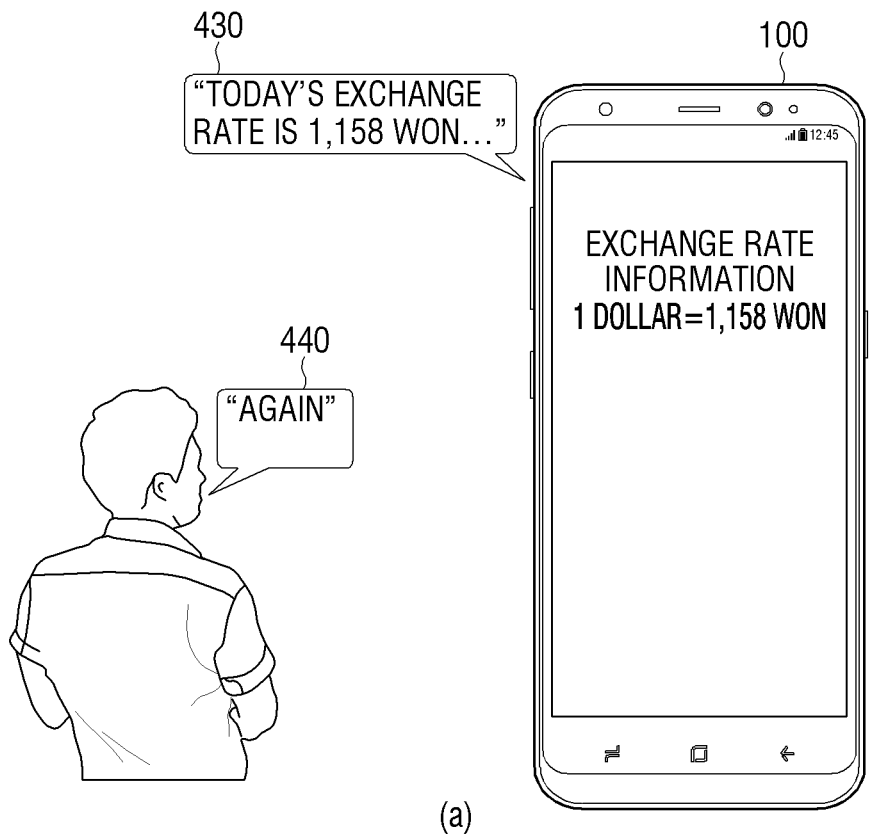
(a)
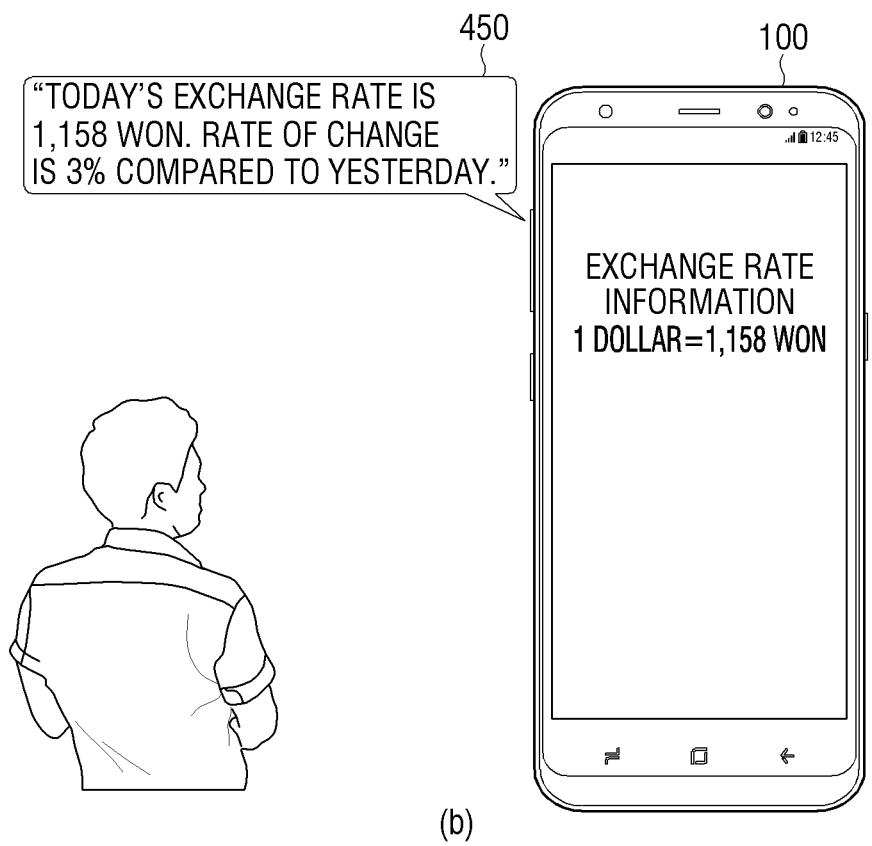
(b)

FIG. 5
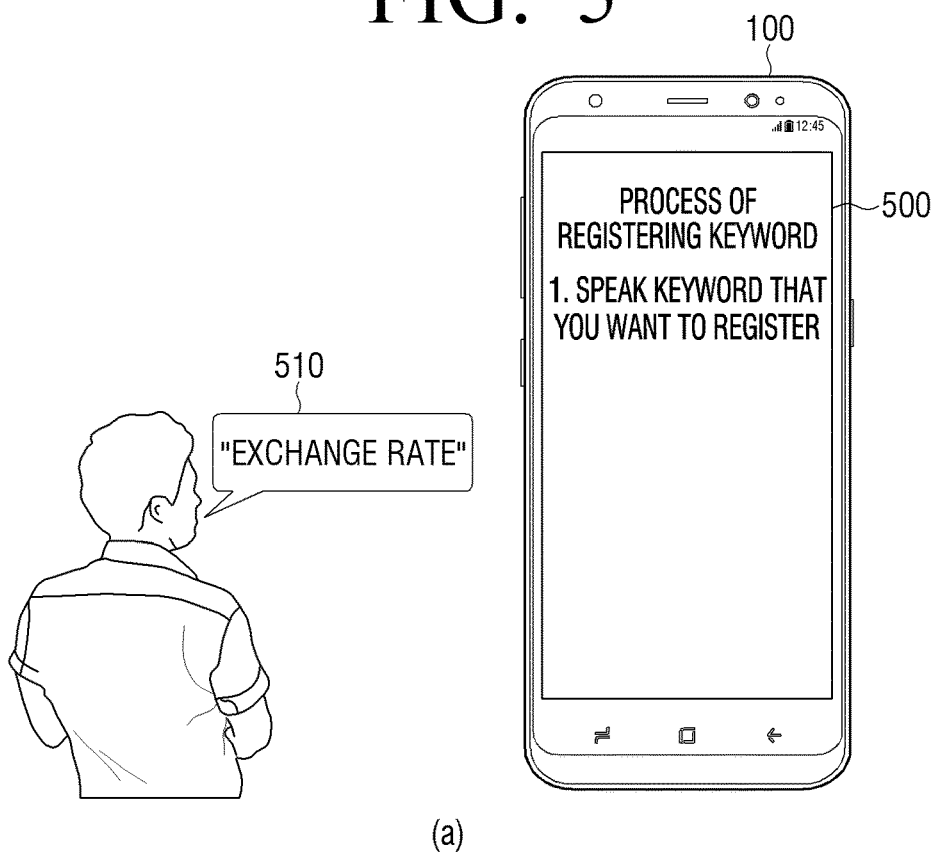
(a)
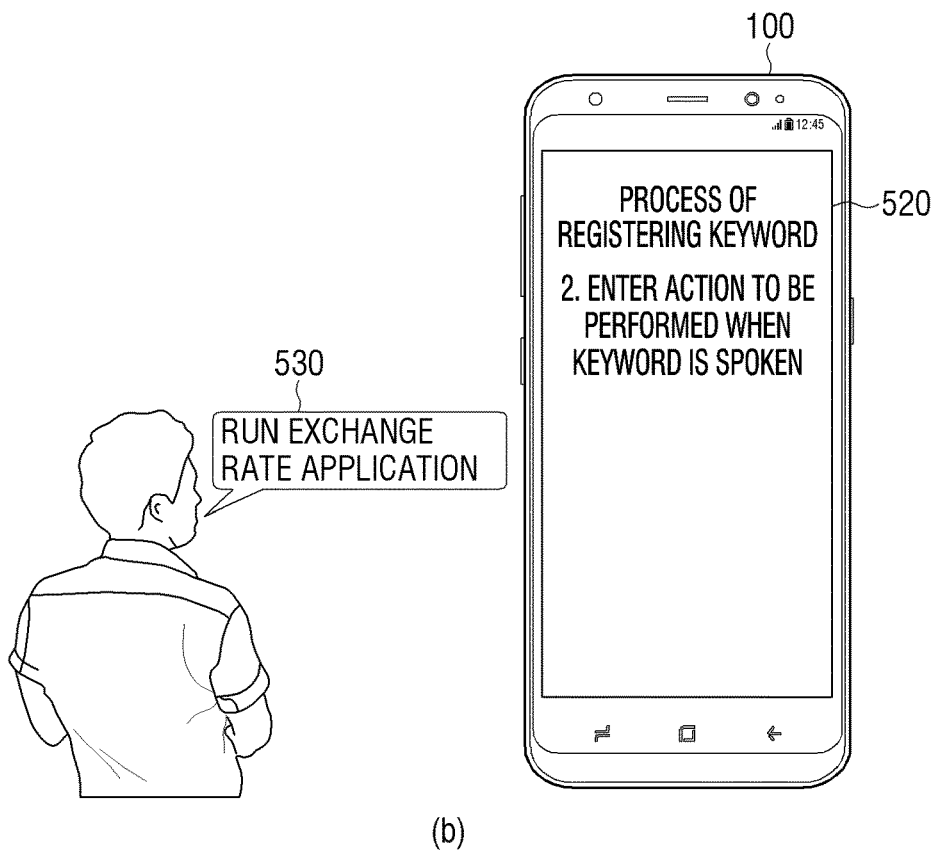
(b)

ELECTRONIC APPARATUS AND CONTROL METHOD THEREOF

CROSS-REFERENCE TO RELATED APPLICATION(S)

This application is based on and claims priority under 35 U.S.C. § 119(a) of a Korean patent application number 10-2019-0156146, filed on Nov. 28, 2019 in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic device for recognizing keywords included in a user voice and performing an operation based on the recognized keywords, and a method of controlling thereof.

2. Description of the Related Art

A voice recognition system using an artificial intelligence system has been recently employed in various fields. The artificial intelligence system is a system that machines get smarter by learning and determining itself, unlike the existing rule-based smart systems. As the artificial intelligence system is used, its recognition rate is improved and the user's taste can be understood more accurately, and the existing rule-based smart system is gradually being replaced by a deep learning-based artificial intelligence system.

The artificial intelligence techniques are formed of element technologies utilizing machine learning (e.g., deep learning) and machine learning.

The machine learning is an algorithm technology for classifying and training features of input data, the element technology is technology that simulates functions such as cognition, determination, etc. of human brains by utilizing the algorithm of the machine learning such deep learning, or the like, and is composed of verbal comprehension, visual comprehension, inference/prediction, knowledge expression, motion control, or the like. In particular, the verbal comprehension is a technology of recognizing human language/letters and applying/processing it, and includes natural language processing, machine translation, dialogue system, question and answer, voice recognition/synthesis or the like.

In the case of the existing voice recognition system, there has been a limitation that the user cannot stop an operation of the speech recognition system through user's voice requesting to stop the operation while the system provides an incorrect response without accurately identifying the intention of the user's voice.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus configured to recognize a keyword through at least one keyword recognition mode executed based on operating state information of the electronic apparatus and a method for controlling thereof Additional aspects will be set forth in part in the description which follows and, in part, will be apparent from the description, or may be learned by practice of the presented embodiments.

In accordance with an aspect of disclosure, an electronic apparatus is provided. The electronic apparatus includes a microphone, a memory configured to store a plurality of keyword recognition models, and a processor, which is coupled with the microphone and the memory, configured to control the electronic apparatus, wherein the processor is configured to selectively execute at least one keyword recognition model among the plurality of keyword recognition models based on operating state information of the electronic apparatus, based on a first user voice being input through the microphone, identify whether at least one keyword corresponding to the executed keyword recognition model is included in the first user voice by using the executed keyword recognition model, and based on at least one keyword identified as being included in the first user voice, perform an operation of the electronic apparatus corresponding to the at least one keyword.

In accordance with another aspect of disclosure, a control method is provided. The method of controlling an electronic apparatus includes selectively executing at least one keyword recognition model among the plurality of keyword recognition models based on operating state information of the electronic apparatus, based on a first user voice being input through a microphone, identifying whether at least one keyword corresponding to the executed keyword recognition model is included in the first user voice by using the executed keyword recognition model, and based on at least one keyword identified as being included in the first user voice, performing an operation of the electronic apparatus corresponding to the at least one keyword.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flowchart illustrating a method of controlling an electronic apparatus according to an embodiment of the disclosure;

FIGS. 3A and 3B are views illustrating an operation of an electronic apparatus when a first keyword recognition model is executed according to various embodiments of the disclosure;

FIGS. 4A, 4B and 4C are views illustrating an operation of an electronic apparatus when a second keyword recognition model is executed according to various embodiments of the disclosure;

FIG. 5 is a view illustrating a process that an electronic apparatus registers keywords according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
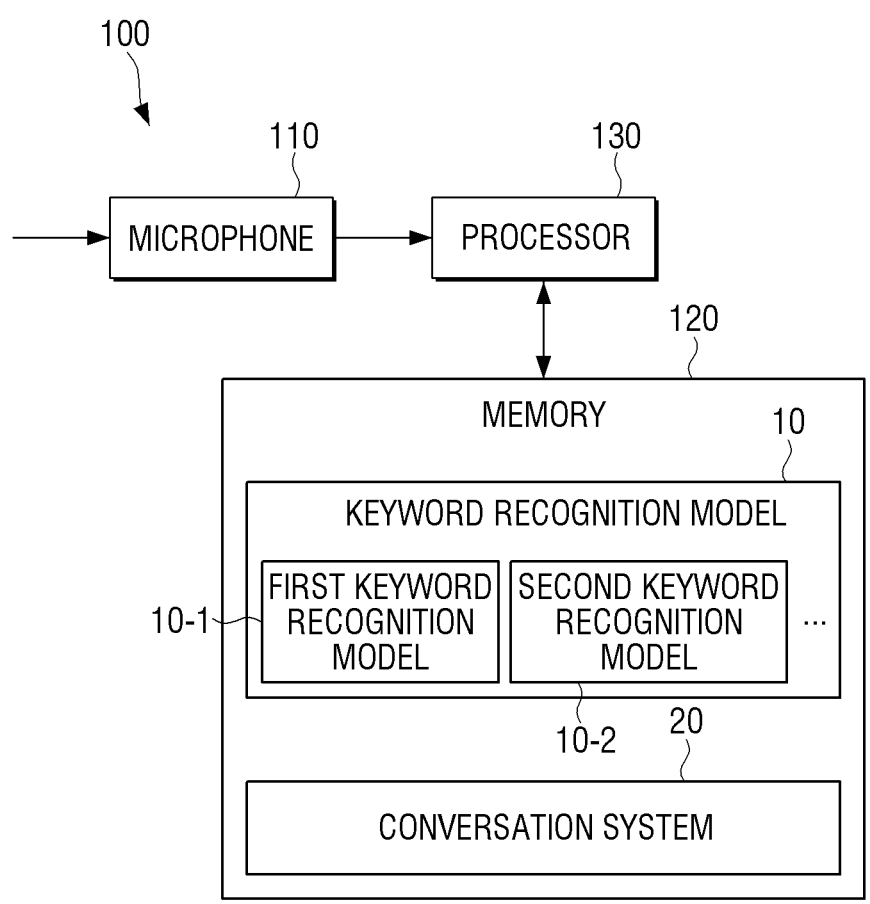
FIG. 1A is a view illustrating a configuration and operations of an electronic apparatus according to an embodiment of the disclosure.

The disclosure is addressed to provide an electronic apparatus configured to recognize a keyword through at least one keyword recognition mode executed based on operating state information of the electronic apparatus and a method for controlling thereof FIG. 1A is a view illustrating a configuration and operations of an electronic apparatus according to an embodiment of the disclosure. Referring to FIG. 1A, an electronic apparatus 100 may include a microphone 110, a memory 120 and a processor 130. However, the configuration illustrated in FIG. 1A is a view for implementing embodiments of the disclosure, and appropriate hardware and software configurations apparent to those skilled in the art may be additionally included in the electronic apparatus 100.

The microphone 110 may receive user voice. In particular, the microphone 110 may receive user voice including a keyword requesting various operations. In addition, the microphone 110 may receive a user query requesting specific information.

The microphone 110 may be provided inside the electronic apparatus 100, but may be provided outside and electrically connected to the electronic apparatus 100. In addition, when the microphone 110 is provided outside, the microphone 110 may transmit a user voice signal generated through a wired/wireless interface (e.g., Wi-Fi, Bluetooth) to the processor 130.

The memory 120 may store instructions or data related to at least one other component of the electronic apparatus 100. In particular, the memory 120 may be implemented as non-volatile memory (e.g., dynamic random-access memory (RAM), static RAM), volatile memory (flash memory), programmable read-only memory (PROM), magneto resistive random-access memory (RRAM) and resistive RAM (RRAM), a hard disk drive (HDD), a solid state drive (SSD), and the like.

Volatile memory refers to a memory that requires constant power supply to maintain stored information. The volatile memory may be implemented as a separate component from the processor 130 that can be linked to the processor 130, but this is only an embodiment, and the volatile memory may be implemented as form included in the processor 130 as a component of a processor 130. In addition, the nonvolatile memory refers to a memory capable of maintaining stored information even when power supply is ceased.

The memory 120 may be accessed by the processor, and perform readout, recording, correction, deletion, update, and the like, on data by the processor 130. According to an embodiment of the disclosure, the term of the memory may include the memory 120, read-only memory (ROM) (not illustrated) and random access memory (RAM) (not illustrated) within the processor 130, and a memory card (not illustrated) attached to the electronic apparatus 100 (e.g., micro secure digital (SD) card or memory stick). Further, the memory 120 may store programs, data, and so on to constitute various screens to be displayed on the display area of the display 210.

In particular, the memory 120 may store the keyword recognition model 10 and a conversation system 20. In the following description of the disclosure, the keyword recognition model 10 and the conversation system 20 will be described on the premise that they are separate structures, but this is only for clearly describing the operation of the electronic apparatus 100 according to the disclosure. The keyword recognition model 10 may be implemented in a form included as one component of the conversation system 20.

The memory 120 may store a program for executing the keyword recognition model 10 and the conversation system 20. In addition, the memory 120 may store a program for acquiring conversation history information related to the conversation system 20. In addition, the memory 120 may store a conversation history while the conversation system 20 is running, and may delete previously stored conversation history information when the execution of the conversation system 20 is ceased.

The keyword recognition model 10 may be stored in a non-volatile memory and loaded into the volatile memory under the control of the processor 130. The process of loading the keyword recognition model 10 from the non-volatile memory to the volatile memory by the processor 130 will be described below.

The keyword recognition model 10 determines whether a signal pattern of user voice input through the microphone 110 is similar to or matches the signal pattern corresponding to a specific keyword, and determines whether the specific keyword is included in the input user voice. When the keyword recognition model 10 recognizes that the specific keyword is included in the input user voice, the electronic apparatus 100 may be controlled to perform an operation corresponding to the specific keyword. The keyword recognition model 10 may include a plurality of keyword recognition models corresponding to each of a plurality of keywords. One keyword recognition model may be configured to recognize the plurality of keywords. In other words, as illustrated in FIG. 1A, the keyword recognition model 10 may include first and second keyword recognition models 10-1 and 10-2. However, this is only an example, and the keyword recognition model 10 may include one or more than three keyword recognition models, and may be added, deleted, or changed by a user command. The configuration and operation of the keyword recognition model will be described in detail with reference to FIG. 1B.

A keyword is at least one word for executing a specific function, keywords may be expressed as a trigger (trigger) word, a wake-up (wake-up) or a function word. Also, the keyword may be pre-registered when the electronic apparatus 100 is manufactured, and may be added/modified/deleted by the user. An embodiment in which keywords are added/modified/deleted by the user will be described in detail with reference to FIG. 5.

The conversation system 20 may include an artificial intelligence model that provides a response by performing voice recognition and language analysis with respect to user voice input through the microphone 110. The conversation system 20 may include various software modules, and each software module may be controlled by the processor 130. Description of each software module will be described with reference to FIG. 6.

The memory 120 may store an operating state database (not shown). The operating state database may include information on the keyword recognition model to be executed according to the operating state of each electronic apparatus. For example, when a state of the electronic apparatus is a first operating state, the operating state database may include information that the first keyword recognition model among the plurality of keyword recognition models is executed by the processor 130. The operating state database may be constructed in a table form of a relational database, as shown in Table 1 below, but this is only an example and may be constructed in various forms. However, states described in the Table 1 and models corresponding to the states are only one embodiment for describing the operating state database and may be implemented in various ways. In addition, the operating state database may be modified/added/deleted by a user command.

TABLE 1

| Type of operating state | Keyword recognition model to be executed |
| --- | --- |
| First operating state | First keyword recognition model |
| Second operating state | Second keyword recognition model |
| Third operating state | Keyword recognition model is not executed |

The processor 130 may be electrically connected to the memory 120 to control an overall operation of the electronic apparatus 100. In particular, the processor 130 may selectively execute at least one keyword recognition model among a plurality of keyword recognition models based on operating state information of the electronic apparatus 100. Meanwhile, the operation of the processor 130 executed by at least one keyword recognition model may include an operation that the keyword recognition model stored in the non-volatile memory is loaded as volatile memory (e.g., dynamic random access memory (DRAM), static RAM (SRAM), and the like under the control of the processor 130.

Specifically, the processor 130 may identify an operating state of the electronic apparatus 100 according to whether the conversation system 20 stored in the memory 120 is deactivated. For example, when the conversation system 20 is deactivated, the processor 130 may identify that the electronic apparatus 100 is operating in the first operating state. As another example, when the conversation system 20 is activated to process text corresponding to the user voice, the processor 130 may identify that the electronic apparatus 100 is operating in the second operating state. As another example, when the conversation system 20 is activated and recognizes the user voice through the ASR module of the conversation system, the processor 130 may identify that the electronic apparatus 100 operates in the third operating state.

The processor 130 may identify the keyword recognition model to be executed according to the operating state of the electronic apparatus 100 identified through the operating state database stored in the memory 120, and load the identified keyword recognition model as a volatile memory in a nonvolatile memory. In other words, the processor 130 may execute a keyword recognition model corresponding to the identified operating state of the electronic apparatus 100. For example, when the electronic apparatus 100 is identified to be operated in the first operating state, the processor 130 may identify that the keyword recognition model corresponding to the first operating state among the plurality of keyword recognition models as a first keyword recognition model 10-1 through the operating state database stored in the memory 120. The processor 130 may execute the identified first keyword recognition model 10-1. As another example, if the electronic apparatus 100 is identified to be operated in the second operating state, the processor 130 may identify that the keyword recognition model corresponding to the second operating state among the plurality of keyword recognition models as the second keyword recognition model 10-2 through the operating state database. The processor 130 may execute the identified second keyword recognition model 10-2. As another example, when the electronic apparatus 100 is identified to be operated in the third operating state, the processor 130 may identify that there is no keyword recognition model to be executed through the operating state database. Thus, the processor 130 may not load the keyword recognition model stored in the non-volatile memory, and obtain text corresponding to the user voice through an ASR module 20-1.

When the conversation system 20 is deactivated, a case in which a plurality of software modules included in the conversation system 20 are not operated may be included. In addition, when the activated conversation system 20 processes the text corresponding to the user voice, a case in which all modules except for the ASR module among a plurality of software modules included in the conversation system 20 are operated may be included.

When a first user voice is input through the microphone 110, the processor 130 may identify whether at least one keyword corresponding to the keyword recognition model executed using the executed keyword recognition model is included in the first user voice. The processor 130 may perform an operation of the electronic apparatus 100 corresponding to the at least one keyword based on at least one keyword identified as being included in the first user voice.

Specifically, if it is identified that at least one keyword including the meaning of requesting a predefined operation is included in the first user voice by using the first keyword recognition model executed while the electronic apparatus 100 is operating in the first operating state, the processor 130 may perform the predefined operation. The predefined operation may be added or deleted by the user, which will be described in detail with reference to FIG. 5.

If it is identified that the keyword including the meaning of requesting a next or previous operation is included in the first user voice by using the first keyword recognition model 10-1 executed while the electronic apparatus 100 is operating in the first operating state, the processor 130 may identify the operation performed by the electronic apparatus by the conversation system 20 before identifying whether the first keyword recognition model 10-1 is included in the first user voice based on the conversation history information stored in the conversation history storage. The processor 130 may control to perform an operation corresponding to the next or previous operation of the operation performed by the identified electronic apparatus 100. For example, when it is identified that the keyword including the meaning of requesting the next operation is included in the first user voice by using the first keyword recognition model 10-1, the processor 130 may identify that the electronic apparatus 100 is operating a music application to listen to music through the conversation system 20 before identifying the first keyword recognition model 10-1 is included in the first user voice. In addition, the processor 130 may control to play the next song on the currently playing song as an operation corresponding to the next operation of the identified operation.

If it is identified that the keyword including the meaning of stopping the operation is included in the first user voice by using the second keyword recognition model 10-2 executed while the electronic apparatus 100 is operating in the second operating state, the processor 130 may control to stop processing of the text corresponding to the second user voice of the conversation system 20. For example, while a response sentence for the second user voice is output in a form of voice by the conversation system 20, the keyword including the meaning of stopping the operation using the second keyword recognition model 10-2 is identified to be included in the first user voice, the processor 130 may control a TTS module of the conversation system 20 to stop the operation of outputting the response sentence in the form of voice.

If it is identified that the keyword including a meaning of repeating the operation using the second keyword recognition model 10-2 executed while the electronic apparatus 100 is operating in the second operating state is included in the first user voice, the processor 130 may stop processing the text corresponding to the second user voice performed by the conversation system 20, and control to repeat the processing of the text of the conversation system 20 based on the conversation history information. For example, while the conversation system 20 is outputting a response sentence for user voice requesting information about today's weather in the form of voice, if it is identified that the keyword (e.g., "again") including the meaning of repeating the operation is included in the first user voice by using the second keyword recognition model 10-2, the processor 130 may stop the TTS module of the conversation system 20 from outputting the response sentence in the form of voice. The processor 130 may identify information on the response sentence for today's weather through the conversation history information, and control the module to output the response sentence for today's weather again through the conversation system 20 by using the identified information.

If it is not identified that the keyword is included in the first user voice by using the second keyword recognition model 10-2 executed while the electronic apparatus 100 is operating in the second operating state, the processor 130 may input the first user voice including the keyword into the ASR module 20-1 of the conversation system 20 to obtain text corresponding to the first user voice. In other words, if it is determined that the keyword is not included in the first user voice using the keyword recognition model, the processor 130 may input the first user voice to the conversation system 20 to perform natural language processing on the user voice. In other words, when the keyword recognition model does not recognize the keyword included in the user voice, the processor 130 may enter the user voice into the conversation system to obtain a response to the user voice, thereby allowing a more natural conversation with the user.

AI-related functions, according to the disclosure, operate through a processor and a memory. The processor may be composed of one or a plurality of processors. In this case, the one or the plurality of processors may be a general-purpose processor such as a CPU, an AP, or a digital signal processor (DSP), a graphic processor such as a GPU or a vision processing unit (VPU), or an AI-only processor such as an NPU. The one or the plurality of processors may control to process input data according to predefined operation rules or artificial intelligence models stored in the memory. Alternatively, when one or more processors are AI-only processors, the AI-only processors may be designed with a hardware structure specialized for processing a specific AI model.

The predefined operation rules or artificial intelligence models are characterized by being generated through learning. By being generated through learning, the basic artificial intelligence model is learned using a plurality of learning data by a learning algorithm, thereby generating a predefined operation rule or artificial intelligence model set to perform a desired characteristic (or purpose). Such learning may be performed on the apparatus on which artificial intelligence according to the disclosure is performed, or may be performed through a separate server and/or system. There are examples of the learning algorithm such as a supervised learning, unsupervised learning semi-supervised learning, or reinforcement learning, but not limited thereto.

The artificial intelligence model may be composed of a plurality of neural network layers. Each of the plurality of neural network layers has a plurality of weight values and performs a neural network calculation through calculation between a result of calculation of a previous layer and a plurality of weight values. The plurality of weight values of the plurality of neural network layers may be optimized by a learning result of the artificial intelligence model. For example, a plurality of weight values may be updated such that a loss value or a cost value obtained from the artificial intelligence model is reduced or minimized during the learning process. The artificial neural network may include deep neural network (DNN), for example, convolutional neural network (CNN), deep neural network (DNN), recurrent neural network (RNN), restricted Boltzmann machine (RBM), deep belief network (DBN), bidirectional recurrent deep neural network (BRDNN) or Deep Q-Networks, but are not limited thereto.

Figure 1B:
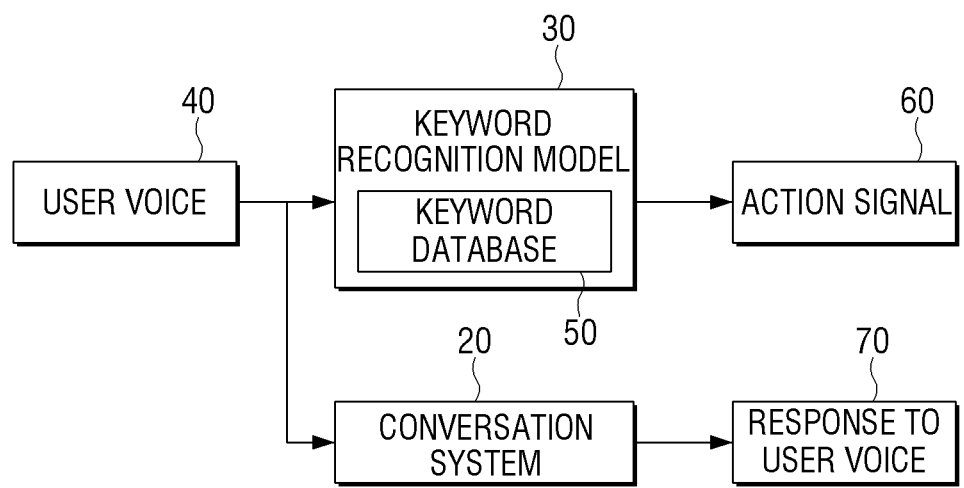
FIG. 1B is a flowchart illustrating a configuration operations of a keyword recognition model according to an embodiment of the disclosure.

FIG. 1B is a flowchart illustrating a configuration operations of a keyword recognition model according to an embodiment of the disclosure.

Referring to FIG. 1B, each of at least one keyword recognition model may include a keyword database 50 for recognizing keywords. However, this is only an embodiment, and the keyword recognition model 10 may include the keyword database 50 common to all of at least one keyword recognition model.

The keyword database 50 may store signal patterns corresponding to keywords and information on operations corresponding to each keyword (e.g., commands for performing operations corresponding to keywords). Information on the operations corresponding to the keywords may be constructed by storing in a table form of a relational database, as shown in Table 2 below. However, this is only an example, and information on operations corresponding to keywords may be constructed in various forms.

TABLE 2

| Type of keyword | Commands for performing operations corresponding to keywords |
|---|---|
| Cancel | Stop_Processing or Stop_Speaking |
| Stop | Stop_Speaking |
| Next | Next_Action |
| Previous | Previous_Action |

The types of keywords and commands for performing operations corresponding to the keywords shown in Table 2 are only an embodiment for specifically describing the disclosure, and may be variously implemented by the type of the electronic apparatus 100, and may be modified/added/deleted by the user. Meanwhile, information on signal patterns corresponding to keywords stored in the keyword database 50 and information on operations corresponding to each keyword may be added or deleted by the user. An embodiment in which keywords are added/deleted by the user will be described in detail with reference to FIG. 5.

When user voice 40 is input, the keyword recognition model 30 may identify whether a keyword corresponding to the keyword recognition model 30 is included in the user voice 40. As an embodiment, the keyword recognition model 30 may identify whether a keyword is included in the user voice 40 by utilizing a keyword spotting technology. Specifically, when the user voice 40 is input, the keyword recognition model 30 may extract a signal pattern of the user voice 40. The keyword recognition model 30 may output a similarity value between signal patterns by comparing and matching the signal pattern of the extracted user voice 40 and the signal pattern corresponding to the keyword. In addition, if there is a portion (or a section) in which the similarity value between signal patterns corresponding to keywords in a signal pattern section of the user voice 40 exceeds a threshold value, the processor 130 may identify that the keyword corresponding to the keyword recognition model 30 is included in the user voice 40. If there is no portion (or section) in which the similarity value between the signal patterns corresponding to the keywords in the signal pattern section of the user voice 40 exceeds the threshold value, the processor 130 may identify that the keyword corresponding to the keyword recognition model 30 is not included in the keyword recognition model 30. Meanwhile, the threshold value may be a preset value through experiment results, etc., and may be changed by a user command As an embodiment, if it is identified that the keyword corresponding to the keyword recognition model 30 is not included in the user voice 40, the processor 130 may input the user voice 40 into the conversation system 20. As another embodiment, the processor 130 may control the display 140 to display a message that the keyword is not included in the user voice 40 or control a speaker 150 to output the message in the form of voice.

In addition, the keyword recognition model 30 may identify information on the operation corresponding to the keyword included in the user voice 40 through the keyword database 50 and output an action signal 60 based on the identified information. Accordingly, the processor 130 may control to perform the operation of the electronic apparatus 100 based on the action signal 60. For example, the second keyword recognition model executed while the electronic apparatus 100 is operating in the second operating state may recognize a keyword "stop". In addition, the second keyword recognition model may identify that a command for performing an operation corresponding to the keyword "stop" is "Stop_Speaking" through the keyword database 50. Also, the second keyword recognition model may output an action signal including the identified command. Accordingly, the processor 130 may control to stop processing of text corresponding to the user voice executed through the conversation system based on the action signal obtained through the second keyword recognition model.

As another example, the first keyword recognition model executed while the electronic apparatus 100 is operating in the first operating state may recognize a keyword "next". Then, the first keyword recognition model may identify that a command for performing an operation corresponding to the keyword "next" is "Next_Action" through the keyword database 50, and output the action signal 60 including the identified command. Accordingly, based on the obtained action signal 60 and conversation history information, the processor 130 may control to perform an operation corresponding to a next operation of the operation performed by the electronic apparatus by the conversation system 20 before the first keyword recognition model recognizes the keyword.

If the electronic apparatus 100 does not recognize the keyword using the second keyword recognition model executed while the electronic apparatus 100 is operation in the second operating state, the processor 130 may input the first user voice including the keyword into the ASR module of the conversation system 20 to obtain the text corresponding to the first user voice, and obtain a response 70 to the user voice based on the text. In other words, when the keyword is not recognized using the keyword recognition model, the processor 130 may input the user voice including the keyword into the conversation system 20 to obtain the response to the user voice, thereby providing a more natural response to the user.

FIG. 2 is a flowchart illustrating a method of controlling an electronic apparatus according to an embodiment of the disclosure.

Referring to FIG. 2, the electronic apparatus 100 may selectively execute at least one keyword recognition model for recognizing user voice among the plurality of keyword recognition models based on operating state information of the electronic apparatus 100 (S210). For example, when the electronic apparatus 100 operates in the first operating state in which the conversation system is deactivated, the electronic apparatus 100 may execute the first keyword recognition model corresponding to the first state among the plurality of keyword recognition models. As another example, when the electronic apparatus 100 operates in the second operating state in which the conversation system is activated and processes text corresponding to the inputted second user voice, the electronic apparatus 100 may execute the second keyword recognition model corresponding to the second state among the plurality of keyword recognition models. As another example, when the electronic apparatus 100 operates in a third operating state that recognizes the second user voice inputted by the activated conversation system through the ASR module of the conversation system, the electronic apparatus 100 may stop the operation of the plurality of keyword recognition models and obtain texts corresponding to the second user voice through the ASR module.

When the first user voice is input through the microphone 110, the electronic apparatus 100 may identify whether at least one keyword corresponding to the keyword recognition model executed by using the executed keyword recognition model is included in the first user voice (S220). The electronic apparatus 100 may perform an operation corresponding to the at least one keyword based on at least one keyword identified as being included in the first user voice (S230).

In an embodiment, when it is identified that a keyword including a meaning of requesting a predefined operation is included in the first user voice by using the first keyword recognition model executed while the electronic apparatus is operating in the first operating state, the electronic apparatus 100 may perform the predefined operation, which will be described in detail with reference to FIG. 3A.

In another embodiment, when it is identified that a keyword including a meaning of requesting a next or previous operation by using the first keyword recognition model executed while the electronic apparatus is operating in the first operating state, the electronic apparatus 100 may identify an operation performed by the electronic apparatus by the conversation system before the first keyword recognition model recognizes a keyword included in the first user voice based on conversation history information. The electronic apparatus 100 may perform an operation corresponding to the next or previous operation of the operation performed by the identified conversation system. The corresponding embodiment will be described in detail with reference to FIG. 3B.

In another embodiment, when it is identified that a keyword including a meaning of stopping or repeating the operation is included in the first user voice using the second keyword recognition model executed while the electronic apparatus is operating in the second operating state, the electronic apparatus 100 may stop processing of text corresponding to the second user voice by the conversation system or perform the process again from the beginning. This embodiment will be described in detail with reference to FIGS. 4A and 4C.

In another embodiment, if it is not identified that the keyword is not included in the first user voice using the keyword recognition model executed while operating in the second operating state, the electronic apparatus 100 may input the user voice into the conversation system to perform natural language processing for the user voice. This embodiment will be described in detail with reference to FIG. 4B.

Figure 3A:
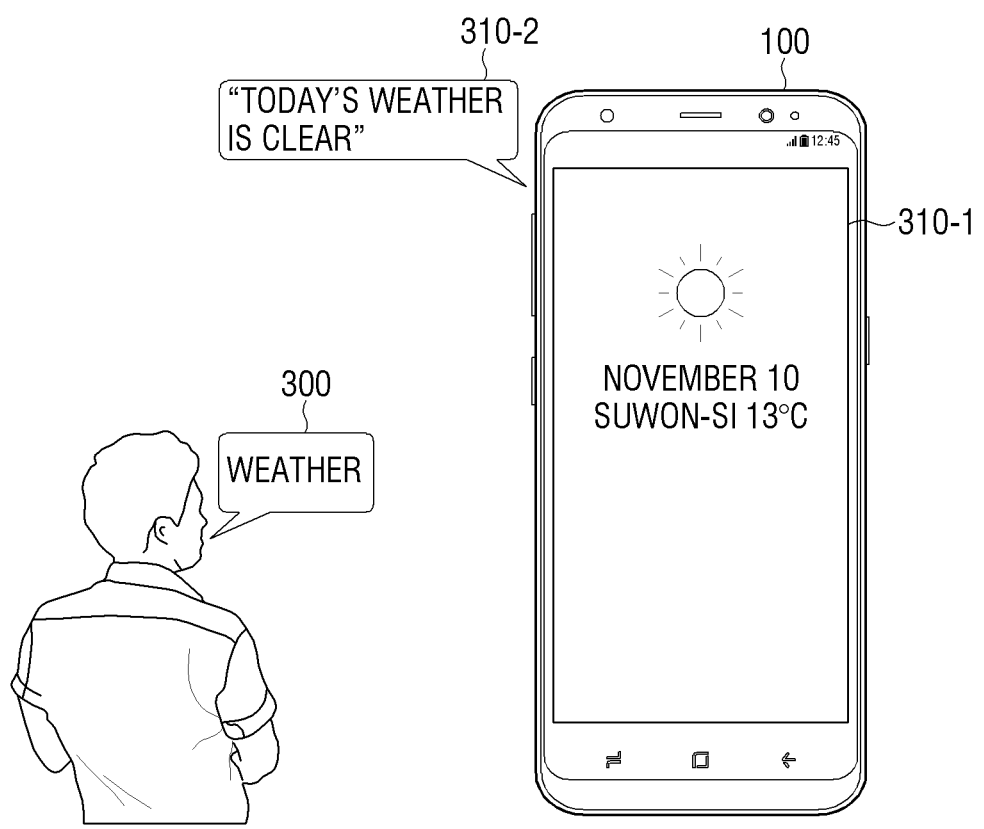

FIGS. 3A and 3B are views illustrating an operation of an electronic apparatus when a first keyword recognition model is executed according to various embodiments of the disclosure.

FIGS. 3A and 3B are views illustrating a process of identifying that the electronic apparatus 100 uses the first keyword recognition model to identify a keyword corresponding to the keyword recognition model is included in the first user voice, and performing an operation based on the identified keyword.

When the electronic apparatus 100 operates in the first operating state in which the conversation system is deactivated, the electronic apparatus 100 may execute the first keyword recognition model among the plurality of keyword recognition models. If it is identified that the first user voice includes the keyword including the meaning of requesting the predefined operation using the first keyword recognition model, the electronic apparatus 100 may perform the predefined operation.

For example, a signal pattern matching the keyword "weather" and information in which an operation corresponding to the keyword "weather" executes a weather application and outputs information on today's weather in the form of voice may be pre stored in the keyword database included in the first keyword recognition model. The operation corresponding to the keyword "weather" pre-stored in the electronic apparatus 100 may be changed by the user.

Referring to FIG. 3A, when user voice 300 including the keyword "weather", which is one of pre-stored keywords, is input, the electronic apparatus 100 may compare and match the signal pattern of the user voice 300 and the signal pattern corresponding to the pre-stored keyword by using the executed first keyword recognition model to obtain a similarity value between the signal patterns. If it is identified that there is a section in which the similarity value to the signal pattern matching the "weather" among the signal pattern sections corresponding to the user voice 300 exceeds a threshold value, the electronic apparatus 100 may identify the keyword "weather" is included in the user voice 300.

In addition, the first recognition keyword model may output an action signal including a command to execute a weather application based on the keyword database and perform an operation of outputting information about today's weather in the form of voice. Accordingly, referring to FIG. 3B, the electronic apparatus 100 may display a screen 310-1 for executing the weather application based on the action signal output by the first recognition keyword model, and output the information about today's weather in the form of voice 310-2.

In one embodiment of the disclosure, when it is identified that the user voice includes a keyword including the meaning of requesting the next or previous operation using the first keyword recognition model executed while operating in the first operating state, the electronic apparatus 100 may identify an operation performed by the conversation system before the first keyword recognition model recognizes the keyword based on the conversation history information.

Referring to FIG. 3B, when user voice 320 requesting playing music is input from the user, the electronic apparatus 100 may obtain a response to the user voice 320 through a conversation system. The electronic apparatus 100 may execute an application that plays music in response to the user voice 320 obtained through the conversation system, and play music while displaying an application execution screen 330. Also, since the conversation system stored in the electronic apparatus 100 is inactive, the electronic apparatus 100 operates in the first operating state, such that the electronic apparatus 100 may execute the first keyword recognition model. At this time, the conversation history information stored in the electronic apparatus 100 may include a type of an application executed in response to the user voice 320 and information on an operation performed through the application.

Then, when a keyword 340 (e.g., "next") including a meaning of requesting a next operation is input from the user, the electronic apparatus 100 may identify the user voice input through the executed first keyword recognition model includes the keyword "next". Then, the electronic apparatus 100 may identify that the electronic apparatus 100 is currently playing music by executing a music application by the conversation system before the keyword 340 is input through the stored conversation history information. In addition, while identifying an operation performed by the electronic apparatus based on the conversation history information, the electronic apparatus 100 may obtain an action signal including a command to perform the next operation through the first keyword recognition model. In addition, the electronic apparatus 100 may play the next song in the application currently being executed as an operation corresponding to the next operation in accordance with the identified operation based on the obtained action signal, and display a play screen 350 of the next song.

Figure 4A:
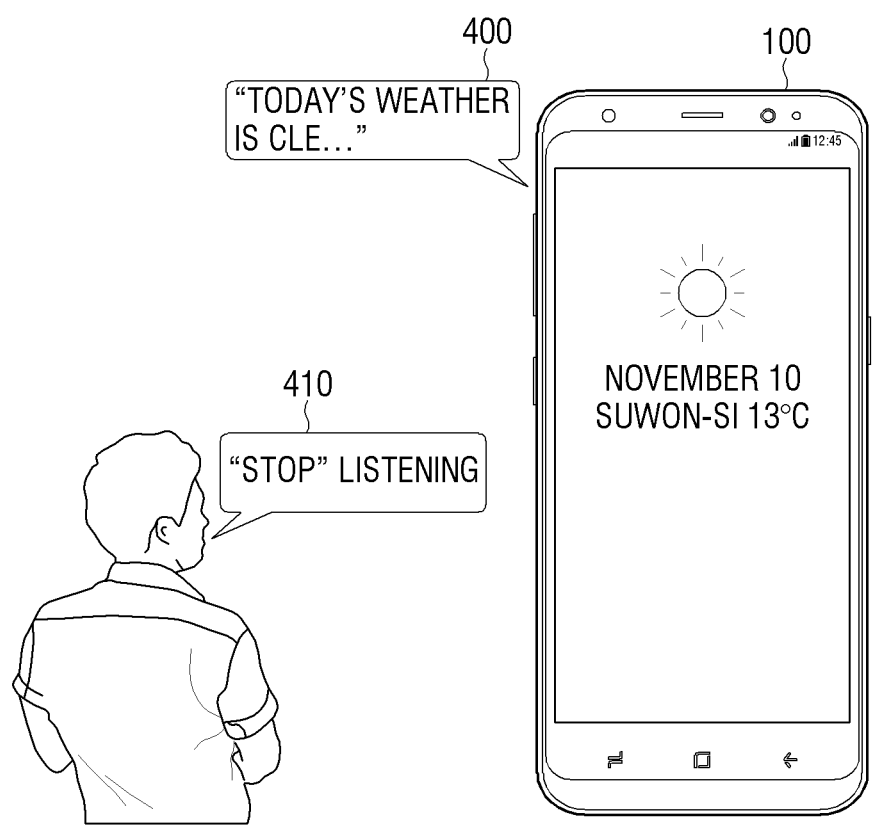

FIG. 4A is a view illustrating that the electronic apparatus identifies that user voice includes a keyword through the second keyword recognition model, and perform an operation based on the identified keyword according to an embodiment of the disclosure.

FIG. 4A illustrates a process in which the electronic apparatus 100 identifies that a keyword is included in a user's voice through a second keyword recognition model and performs an operation based on the identified keyword, according to an embodiment of the disclosure It is a drawing for doing.

Referring to FIG. 4A, the electronic apparatus 100 may execute the second keyword recognition model among a plurality of keyword recognition models in a second operating state that processes text corresponding to the user voice input by an activation of a conversation system. For example, when user voice requesting information about weather is input, the electronic apparatus 100 may execute a weather application in response to the user voice obtained through the conversation system, and output information about today's weather 400 in the form of voice. Since a response sentence for the user voice requesting weather information is output in the form of voice through the TTS module of the conversation system, the electronic apparatus 100 may execute the second keyword recognition model corresponding to the second operating state among the plurality of keyword models.

In addition, if it is identified that a keyword (e.g., "stop") including a meaning of stopping the operation is included in user voice 410 through the second keyword recognition model executed while operating in the second operating state, the electronic apparatus 100 may stop processing the text corresponding to the second user voice by the conversation system. For example, while outputting a response sentence for the user voice requesting weather information in the form of voice, the electronic apparatus 100 may identify that the user voice includes a keyword including a meaning to stop the operation through the second keyword recognition model. Then, the electronic apparatus 100 may obtain an action signal including a command to stop the operation of the conversation system through the second keyword recognition model. The electronic apparatus 100 may stop process of text performed by the conversation system (e.g., an operation in which the conversation system outputs a response sentence for a user voice requesting weather through the TTS module in the form of voice form) based on the obtained action signal. Accordingly, as illustrated in FIG. 4A, when the user voice including the keyword to stop an operation is input while outputting the response sentence 400 for the user voice in the form of voice through the conversation system, the electronic apparatus 100 may stop the operation of the conversation system.

If it is not identified that the keyword including the meaning of stopping the operation is included in the user voice 410 through the second keyword recognition model while outputting the response sentence to the user voice in the form of voice through the conversation system, the electronic apparatus 100 may input the user voice 410 into the conversation system to obtain text corresponding to the user voice 410. In one embodiment, due to noise in the surrounding environment, temporary change in user voice, and the like, the electronic apparatus 100 may use the second keyword recognition model to obtain similarity values between signal patterns corresponding to signal patterns corresponding to the user voice 410 below a threshold value.

As another example, if user voice including a keyword different from the pre-stored keyword is input to the electronic apparatus 100 due to the user's error, the electronic apparatus 100 may obtain a similarity value below a threshold value through the second keyword recognition model. In this case, the electronic apparatus 100 may obtain a text corresponding to the user voice by inputting the voice input from the user into the conversation system. Also, the electronic apparatus 100 may obtain a response to the user voice based on the obtained text.

Figure 4B:
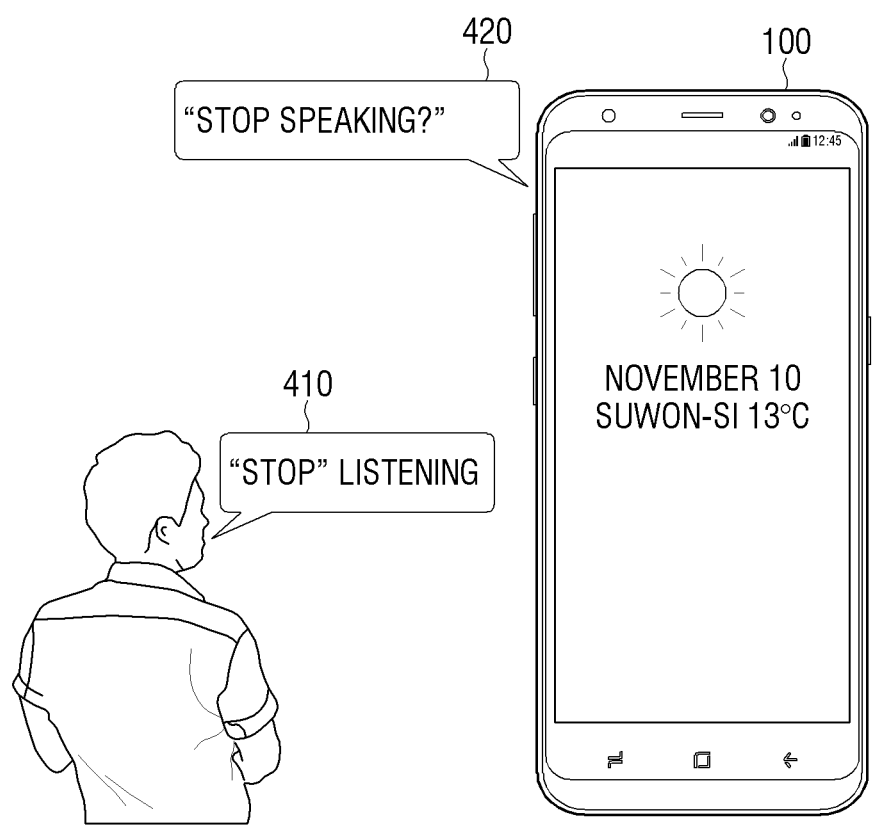

FIG. 4B is a view illustrating an operation of an electronic apparatus when a second keyword recognition model is executed according to an various embodiments of the disclosure.

Referring to FIG. 4B, if it is not identified that the user voice 410 includes the keyword including the meaning of stopping the operation while the response sentence for the user voice requesting the weather is output in the form of voice, the electronic apparatus 100 may input the user voice 410 into the conversation system. The electronic apparatus 100 may output voice "Do you want me to stop talking?" 420 in response to the user voice 410. As another example, the electronic apparatus 100 may stop an operation (e.g., execution of the weather application) performed by the conversation system based on the conversation history information. In other words, even if the keyword is not recognized through the second keyword recognition model, the electronic apparatus 100 may perform a natural conversation with the user by obtaining a response by inputting the user voice including the keyword into the conversation system.

When it is identified that the user voice includes a keyword including the meaning of repeating the operation by using the second keyword recognition model executed while operating in the second operating state, the electronic apparatus 100 may stop processing text corresponding to the user voice that is performed by the conversation system, and perform processing text based on the conversation history information again.

FIG. 4C is a view illustrating an operation of an electronic apparatus when a second keyword recognition model is executed according to an various embodiments of the disclosure.

Referring to FIG. 4C, when a response sentence 430 for the user voice requesting exchange rate information is output in the form of voice, the electronic apparatus 100 may perform the second keyword recognition model corresponding to the second operating state among the plurality of keyword recognition models. In addition, if it is identified that the user voice includes the keyword including the meaning of repeating the operation (e.g., "again") 440, the electronic apparatus 100 may stop processing text corresponding to the user voice performed by the conversation system. (e.g., the operation of outputting the response sentence 430 for the user voice in which the conversation system requests exchange rate information through the TTS module in the form of voice).

The electronic apparatus 100 may perform text processing corresponding to the user voice again based on the conversation history information. For example, the electronic apparatus 100 may identify a response sentence for the user voice requesting exchange rate information through the conversation history information, and output the response sentence 450 identified through the conversation system in the form of voice.

FIG. 5 is a view illustrating a process that an electronic apparatus registers keywords according to an embodiment of the disclosure. In one embodiment, when a user command for registering a keyword is input, the electronic apparatus 100 may display a UI 500 capable of registering the keyword.

Referring to FIG. 5, section (a), the UI 500 capable of registering keywords may include a message for the user to utter a keyword that the user wants to register, but this is only an embodiment, and the UI 500 may be variously implemented according to a type of the electronic apparatus 100 or a user command When voice corresponding to the keyword (e.g., "keyword") 510 is input from the user, the electronic apparatus 100 may obtain and store a signal pattern corresponding to the input voice. In one embodiment, the electronic apparatus 100 may store a signal pattern corresponding to voice on the keyword database. Meanwhile, the electronic apparatus 100 may display a message requesting utterance of the keyword a predetermined number of times for an accuracy of the signal pattern corresponding to the keyword.

In addition, referring to FIG. 5, section (b), when a signal pattern corresponding to the keyword is obtained from the user, the electronic apparatus 100 may display a UI 520 requesting information about an operation to be performed when the keyword is spoken. When user voice (e.g., "Run exchange rate application") 510 including information on an operation to be performed when a keyword is spoken is input from the user, the electronic apparatus 100 may obtain a response (e.g., an operation of executing the exchange rate application) to the user voice 510 through the conversation system, and identify the obtained information as the operation corresponding to the keyword. Also, the electronic apparatus 100 may match and store information about a signal pattern corresponding to the keyword and an operation corresponding to the identified keyword. As described with reference to FIG. 1B, the electronic apparatus 100 may construct and store information and keywords with respect to the operation corresponding to the identified keyword in the form of a table in a relational database, but is only embodiment. The electronic apparatus 100 may receive information about the application to be executed when speaking the keyword by the user, and information about the content to be played through not only voice but also a variety of input means. For example, when a user touch with respect the content to be executed or an icon of the application when uttering a keyword is input, the electronic apparatus 100 may match and store an operation of executing the input content or application with a signal pattern corresponding to the keyword.

Figure 6:
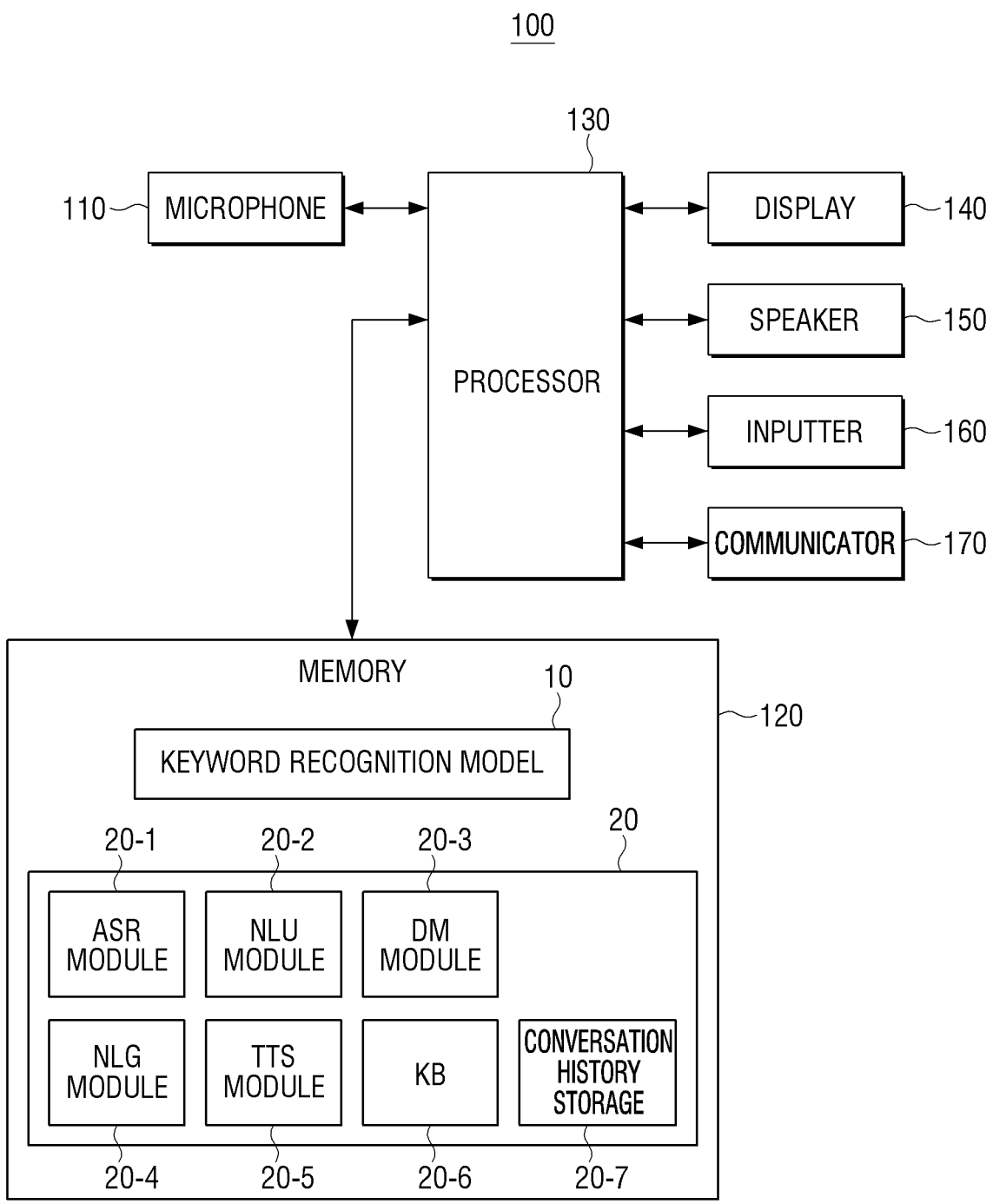
FIG. 6 is a block diagram illustrating a configuration of an electronic apparatus in detail according to an embodiment of the disclosure.

FIG. 6 is a block diagram illustrating a configuration of an electronic apparatus in detail according to an embodiment of the disclosure. Referring to FIG. 6, the electronic apparatus 100 may include a microphone 110, a memory 120, a processor 130, a display 140, a speaker 150, an inputter 160, and a communicator 170. However, since the microphone 110, the memory 120, and the processor 130 have been described in detail with reference to FIG. 1, redundant description will be omitted.

The conversation system 20 may be stored in the memory 120. In addition, the conversation system 20 may include a plurality of software modules that can be controlled by the processor 130 as shown in FIG. 6. When a trigger voice for activating the conversation system 20 is input by the user through the microphone 110 or a user command is input through an inputter (e.g., an AI agent button, etc.) capable of activating the conversation system, the ASR module 20-1 of the conversation system 20 may be activated.

The automatic speech recognition (ASR) module 20-1 may perform voice recognition for the user voice input through the microphone 110 and output text corresponding to the recognized voice. For example, if the user voice "How is the weather today" is input, the ASR module 20-1 may recognize the user voice and output text "How is the weather today" corresponding to the recognized voice.

The natural language understanding (NLU) module 20-2 may determine user's intention an parameters by using a matching rule divided in to a parameter (or slot) required to identify a domain of the user voice and intention based on a result of voice recognition obtained through the ASR module 20-1. Specifically, one domain (e.g., an alarm) may include a plurality of intentions (e.g., alarm setting, alarm cancellation), and one intention may include a plurality of parameters (e.g., time, number of repetitions, notification sound, etc.). The matching rule may be stored in the NLU database (not shown). In addition, the NLU module 20-2 may identify the meaning of words extracted from the user input using linguistic features such as morphemes and phrases (e.g., grammatical elements), and match the meaning of the identified word to the domain and intention to determine the user's intention.

For example, when the text corresponding to the user voice obtained through the ASR module 20-1 is "How is the weather today", the NLU module 20-2 may identify the meaning of "weather today", "how", or the like, and classify the domain of the text as "weather" to obtain user's intention requesting information about todays' weather.

A dialogue management (DM) module 20-3 may identify whether the user's intention identified by the NLU module 20-2 is clear. For example, the DM module 20-3 may identify whether the user's intention is clear based on whether the parameter information is sufficient.

Also, the DM module 20-3 may generate a result of performing a task corresponding to a user input based on the intention and parameters identified in the NLU module 20-2. In other words, the DM module 20-3 may obtain information for generating response sentences based on the intention of the user voice, data stored in a knowledge base (KB) 20-6, or information received by an external server identified through the NLU module 20-2. Information for generating a response sentence may be obtained based on the obtained information. For example, in the NLU module 20-2, when the user obtains the intention to request information about "weather today", the DM module 20-3 may obtain response information including information related to the weather today based on the data stored in the knowledge base 20-6.

A natural language generator (NLG) module 20-4 outputs a response sentence to the user voice in a form of a text, which is the form of natural language utterance, based on response information obtained through the DM module 20-3 and the conversation history information stored in a history storage 20-7.

A text to speech (TTS) module 20-5 may convert the generated response sentence into voice. In particular, the TTS module 20-5 may convert text obtained through the NLG module 20-4 into voice. Thereby, the conversation system 20 may provide a response sentence for the user voice as voice.

The knowledge base 20-6 may store information for personalized responses. In particular, information stored in the knowledge base 20-6 may vary. For example, the knowledge base 20-6 may store information related to a user command input to the electronic apparatus 100, information about an application or content included in the electronic apparatus 100, and the like.

The conversation history storage 20-7 may store conversation history information. The conversation history information is related to the user voice input through the microphone 110, and may include information about a voice recognition result obtained before the user voice is input, a language analysis result, and a response output by the conversation system 20. Can. In addition, the conversation history information may store information on a task performed by the electronic apparatus 100 before the user's voice is input.

The conversation history storage 20-7 may store conversation history information. The conversation history information may be related to user voice input through the microphone 110, and may include information on a result of voice recognition obtained before the user voice is input, information on a result of language analysis, and information on responses outputted by the conversation system 20. Also, the conversation history information may store information on the work that has been performed by the electronic apparatus 100 before the user voice is input.

The display 140 may display various information under the control of the processor 130. In particular, the display 140 may display a UI registering a keyword or a UI requesting information about an operation to be performed when the keyword is spoken. In addition, the display 140 may display a message that each keyword recognition model does not recognize the keyword.

In addition, the display 140 may be implemented as a touch screen together with a touch panel, but this is only an example and may be variously implemented according to the type of the electronic apparatus 100.

The speaker 150 may include various audio output circuitry and is configured to output various kinds of alarm sounds or voice messages in addition to various audio data on which various processing operations such as decoding, amplification, and noise filtering are performed by an audio processor. In particular, the speaker 150 may output a response to the user voice obtained through the conversation system as a voice message in the form of natural language. Specifically, a configuration for outputting audio may be implemented as a speaker, but is only an embodiment, and may be implemented as an output terminal capable of outputting audio data.

The inputter 160 may receive a user input for controlling the electronic apparatus 100. In particular, the inputter 160 may include a touch panel for receiving a user touch using a user's hand or a stylus pen, etc., and a button for receiving a user manipulation, or the like. In addition, the inputter 160 may be implemented with other input devices (e.g., keyboard, mouse, motion inputter, etc.). In particular, the inputter 160 may receive information on an operation corresponding to a keyword from a user.

The communicator 170 may communicate with an external device. In this case, the communicator 170 may include communicating through a third device (e.g., a repeater, a hub, an access point, a server or a gateway, etc.) which is communicatively connected to the external device. For example, the communicator 170 may receive information related to contents or applications from the external server.

The communicator 170 may include various communication modules to perform communication with the external device. For example, the communicator 170 may include a wireless communication module such as a cellular communication module using at least one among long-term evolution (LTE), LTE Advance (LTE-A), 5th Generation (5G), code division multiple access (CDMA), wideband CDMA (WCDMA), universal mobile telecommunications system (UMTS), wireless broadband (WiBro), and global system for mobile communications (GSM). According to an another embodiment, wireless communication may include at least one of, for example, wireless fidelity (Wi-Fi), Bluetooth, Bluetooth low energy (BLE), Zigbee, near field communication (NFC), magnetic secure transmission, radio frequency (RF), or body area network BAN.

As described above, according to various embodiments of the disclosure, the electronic apparatus may recognize a keyword through at least one keyword recognition model executed based on state information of the electronic apparatus to determine an operation, thereby enabling the user to more efficiently use the conversation system.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In the disclosure, the terms "include", "may include", "comprise", and "may comprise" designate the presence of features (e.g., elements, such as numbers, functions, operations, or components) that are written in the specification, but do not exclude the presence or possibility of addition of one or more other features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, "a sub-processor configured (or configured to) perform A, B, and C" may refer to a generic-purpose processor (e.g., central processing unit (CPU) or an application processor) capable of performing corresponding operations by executing a dedicated processor (e.g., an embedded processor) or one or more software programs stored in a memory device to perform the operations.

An electronic apparatus according to various embodiments may include at least one of, for example, smartphone, tablet personal computer (PC), mobile phone, video phone, e-book reader, desktop PC, laptop PC, netbook computer, server, personal digital assistant (PDA), medical device, or a wearable device. In some embodiments, the electronic apparatus may include at least one of a television, a refrigerator, an air conditioner, an air purifier, a set top box, a media box (e.g., Samsung HomeSync™, Apple TV™, or Google TV™).

In an embodiment of the disclosure, the term "a user" may indicate a person using an electronic apparatus or an apparatus which uses an electronic apparatus (e.g., artificial intelligent electronic apparatus). Hereinafter, this will be greater described with reference to the drawings.

According to an embodiment of the disclosure, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media. For example, the 'non-transitory' may include a buffer that data is temporarily stored.

According to an embodiment of the disclosure, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

Further, each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various embodiments, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a microphone;
   a memory storing a plurality of keyword recognition models; and
   a processor, which is coupled with the microphone and the memory, configured to control the electronic apparatus,
   wherein the processor is further configured to:
      determine whether the electronic apparatus is operating in a first operating state, a second operating state, or a third operating state,
      selectively execute a first keyword recognition model, a second keyword recognition model, or a third keyword recognition model among the plurality of keyword recognition models based on operating state information indicating the electronic apparatus is operating in the first operating state, the second operating state, or the third operating state,
      based on a first user voice being input through the microphone, identify whether at least one keyword corresponding to the executed first keyword recognition model, the executed second keyword recognition model, or the executed third keyword recognition model is included in the first user voice by using the executed first keyword recognition model, the executed second keyword recognition model, or the executed third keyword recognition model, and
      based on at least one keyword identified as being included in the first user voice, perform an operation of the electronic apparatus corresponding to the at least one keyword.

2. The electronic apparatus of claim 1, wherein the processor is further configured to:
   obtain a similarity value between a signal pattern of the at least one keyword and a signal pattern of the first user voice through the executed first keyword recognition model, the executed second keyword recognition model, or the executed third keyword recognition model, and
   based on a similarity value of the signal pattern of the at least one keyword exceeding a threshold value among the signal pattern of the first user voice, identify that the first user voice includes the at least one keyword.

3. The electronic apparatus of claim 1,
   wherein the processor is further configured, based on the electronic apparatus operating in a first operating state in which a conversation system stored in the electronic apparatus is deactivated, to execute a first keyword recognition model corresponding to the first operating state among the plurality of keyword recognition models, and
   wherein the processor is further configured, based on the electronic apparatus operating in a second operating state configured to process text corresponding to a second user voice input through the microphone by an activated conversation system, to execute a second keyword recognition model corresponding to the second operating state among the plurality of keyword recognition models.

4. The electronic apparatus of claim 3, wherein the processor is further configured to:
   based on the keyword being not recognized by using the second keyword recognition model executed while operating in the second operating state, input the first user voice to an automatic speech recognition (ASR) module of the conversation system to obtain text corresponding to the first user voice, and
   provide a response to the first user voice based on the text corresponding to the first user voice.

5. The electronic apparatus of claim 3, wherein the processor is further configured to, based on the electronic apparatus operating in a third operating state configured to recognize a second user voice input through the microphone by the activated conversation system, through an automatic speech recognition (ASR) module of the conversation system, stop executing the plurality of keyword recognition models and obtain text corresponding to the second user voice through the ASR module.

6. The electronic apparatus of claim 3, wherein the processor is further configured to, based on a keyword including a meaning of requesting a predefined operation being identified as being included in the first user voice by using the first keyword recognition model executed while operating in the first operating state, control to perform the predefined operation.

7. The electronic apparatus of claim 3, wherein the processor is further configured to:
based on a keyword including a meaning of requesting a next or previous operation being identified as being included in the first user voice by using the first keyword recognition model executed while operating in the first operating state, identify an operation performed by the electronic apparatus by the conversation system before the first keyword recognition model identifies that the keyword is included in the first user voice, on a basis of conversation history information, and
control to perform an operation corresponding to the next or previous operation of the operation performed by an identified electronic apparatus.

8. The electronic apparatus of claim 3, wherein the processor is further configured to, based on a keyword including a meaning of stopping an operation being identified as being included in the first user voice by using the second keyword recognition model executed while operating in the second operating state, control to stop processing with respect to text corresponding to the second user voice by the conversation system.

9. The electronic apparatus of claim 3, wherein the processor is further configured to, based on a keyword including a meaning of repeating an operation being identified as being included in the first user voice by using the second keyword recognition model executed while operating in the second operating state, control to stop processing the text corresponding to the second user voice performed by the conversation system and to repeat processing of the text based on conversation history information.

10. A method of controlling an electronic apparatus comprising:
determining whether the electronic apparatus is operating in a first operating state, a second operating state, or a third operating state;
selectively executing a first recognition model, a second keyword recognition model, or a third keyword recognition model among a plurality of keyword recognition models based on operating state information indicating the electronic apparatus is operating in the first operating state, the second operating state, or the third operating state;
based on a first user voice being input through a microphone, identifying whether at least one keyword corresponding to the executed first keyword recognition model, the executed second keyword recognition model, or the executed third keyword recognition model is included in the first user voice by using the executed first keyword recognition model, the executed second keyword recognition model, or the executed third keyword recognition model; and
based on at least one keyword identified as being included in the first user voice, performing an operation of the electronic apparatus corresponding to the at least one keyword.

11. The method of claim 10, wherein the identifying comprises:
obtaining a similarity value between a signal pattern of the at least one keyword and a signal pattern of the first user voice through the executed first keyword recognition model, the executed second keyword recognition model, or the executed third keyword recognition model; and
based on a similarity value of the signal pattern of the at least one keyword exceeding a threshold value among the signal pattern of the first user voice, identifying that the first user voice includes the at least one keyword.

12. The method of claim 10, wherein the executing comprises:
based on the electronic apparatus operating in a first operating state in which a conversation system stored in the electronic apparatus is deactivated, executing a first keyword recognition model corresponding to the first operating state among the plurality of keyword recognition models, and
based on the electronic apparatus operating in a second operating state that processes text corresponding to a second user voice input through the microphone by an activated conversation system, executing a second keyword recognition model corresponding to the second operating state among the plurality of keyword recognition models.

13. The method of claim 12, wherein the recognizing comprises:
based on the keyword being not recognized by using the second keyword recognition model executed while operating in the second operating state, inputting the first user voice to an automatic speech recognition (ASR) module of the conversation system to obtain text corresponding to the first user voice, and
providing a response to the first user voice based on the text corresponding to the first user voice.

14. The method of claim 12, wherein the executing comprises, based on the electronic apparatus operating in a third operating state configured to recognize a second user voice input through the microphone by the activated conversation system, through an automatic speech recognition (ASR) module of the conversation system, stopping execution of the plurality of keyword recognition models and obtaining text corresponding to the second user voice through the ASR module.

15. The method of claim 12, wherein the performing comprises, based on a keyword including a meaning of requesting a predefined operation being identified as being included in the first user voice by using the first keyword recognition model executed while operating in the first operating state, controlling to perform the predefined operation.

16. The method of claim 12, wherein the performing comprises:
based on a keyword including a meaning of requesting a next or previous operation being identified as being included in the first user voice by using the first keyword recognition model executed while operating in the first operating state, identifying an operation performed by the electronic apparatus by the conversation system before the first keyword recognition model identifies that the keyword is included in the first user voice, on a basis of conversation history information; and performing an operation corresponding to the next or previous operation of the operation performed by an identified electronic apparatus.

17. The method of claim 12, wherein the performing comprises, based on a keyword including a meaning of stopping an operation being identified as being included in the first user voice by using the second keyword recognition model executed while operating in the second operating state, stopping processing with respect to text corresponding to the second user voice by the conversation system.

18. The method of claim 12, wherein the performing comprises, based on a keyword including a meaning of repeating an operation being identified as being included in the first user voice by using the second keyword recognition model executed while operating in the second operating state, stopping processing the text corresponding to the second user voice performed by the conversation system and to repeat processing of the text based on conversation history information.

* * * * *